United States Patent
Ball et al.

(10) Patent No.: US 12,452,640 B2
(45) Date of Patent: Oct. 21, 2025

(54) AUTOMATED AUDITS RELATING TO NETWORK CONFIGURATION UPDATES IN RESPONSE TO ROAMING PARTNER UPDATES

(71) Applicant: T-Mobile USA, Inc., Bellevue, WA (US)

(72) Inventors: Raymond T. Ball, Seattle, WA (US); Suryanarayana Gorty, Bellevue, WA (US); Paria Hakimi, Bellevue, WA (US); Cesar Mandanas, Bellevue, WA (US); Vineeth Appukkuttan Nair, Bellevue, WA (US); Allen G. Ricciardi, Bellevue, WA (US); Carmine Shelton, Bellevue, WA (US); Sushma Shetty, Belleuve, WA (US); Ravikumar Subramanian, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 509 days.

(21) Appl. No.: 18/076,669

(22) Filed: Dec. 7, 2022

(65) Prior Publication Data

US 2024/0187975 A1    Jun. 6, 2024

Related U.S. Application Data

(60) Provisional application No. 63/429,357, filed on Dec. 1, 2022.

(51) Int. Cl.
*H04W 8/02*     (2009.01)
*H04W 8/04*     (2009.01)
(Continued)

(52) U.S. Cl.
CPC ........... *H04W 8/02* (2013.01); *H04W 8/04* (2013.01); *H04W 8/12* (2013.01); *H04W 28/24* (2013.01); *H04W 48/18* (2013.01); *H04W 88/06* (2013.01)

(58) Field of Classification Search
CPC .......... H04W 8/02; H04W 8/04; H04W 8/12; H04W 28/24; H04W 48/18; H04W 88/06; H04W 24/02
See application file for complete search history.

(56) References Cited

U.S. PATENT DOCUMENTS

| | | |
|---|---|---|
| 5,577,264 A | 11/1996 | Tuohino |
| 5,926,745 A | 7/1999 | Threadgill et al. |

(Continued)

FOREIGN PATENT DOCUMENTS

| | | |
|---|---|---|
| CN | 1345688 A | 4/2002 |
| CN | 105592525 A | 5/2016 |

(Continued)

*Primary Examiner* — Julio R Perez
(74) *Attorney, Agent, or Firm* — Perkins Coie LLP

(57) ABSTRACT

A first mobile network operator (MNO) periodically retrieves roaming network updates for reconfiguring one or more network subsystems of a network operated by the first MNO. A portion of the roaming network update is retrieved from an operator master database (OMD). The roaming network update includes roam data associated with a second MNO and configuration data for the one or more network subsystems. The roam data is retrieved via IR.21 information from a cloud server associated with the second MNO. The roam data specifies one or more telecommunications carriers associated with the second MNO. The one or more network subsystems for reconfiguration are identified based on the roaming network update. The one or more network subsystems are reconfigured using the roaming network update to enable one or more user devices associated with the second MNO for roaming on the network.

20 Claims, 11 Drawing Sheets

(51) Int. Cl.
    *H04W 8/12*           (2009.01)
    *H04W 28/24*         (2009.01)
    *H04W 48/18*         (2009.01)
    *H04W 88/06*         (2009.01)

(56) References Cited

U.S. PATENT DOCUMENTS

| | | |
|---|---|---|
| 5,943,619 A | 8/1999 | Coyne et al. |
| 6,073,015 A | 6/2000 | Berggren et al. |
| 6,453,174 B1 | 9/2002 | Cunningham et al. |
| 6,975,852 B1 | 12/2005 | Sofer et al. |
| 7,006,825 B2 | 2/2006 | Toernkvist |
| 7,031,704 B2 | 4/2006 | Di et al. |
| 7,127,245 B2 | 10/2006 | Almgren |
| 7,133,670 B1 | 11/2006 | Moll et al. |
| 7,184,764 B2 | 2/2007 | Raviv et al. |
| 7,356,337 B2 | 4/2008 | Florence |
| 7,525,936 B2 | 4/2009 | Buckley et al. |
| 7,539,159 B2 | 5/2009 | Devarapalli et al. |
| 7,609,682 B2 | 10/2009 | Ang et al. |
| 7,613,454 B2 | 11/2009 | Zhang |
| 7,738,426 B2 | 6/2010 | Smith et al. |
| 7,844,728 B2 | 11/2010 | Anderson et al. |
| 7,900,039 B2 * | 3/2011 | Shim ................ H04L 63/166 455/433 |
| 7,929,953 B2 | 4/2011 | Jiang |
| 7,991,394 B2 | 8/2011 | Gonen et al. |
| 8,223,717 B2 | 7/2012 | Dillon et al. |
| 8,238,905 B2 | 8/2012 | Jiang |
| 8,254,916 B2 | 8/2012 | Jessen et al. |
| 8,260,290 B2 | 9/2012 | Pressley et al. |
| 8,285,280 B2 | 10/2012 | Kim |
| 8,295,830 B1 | 10/2012 | Faccin |
| RE43,856 E | 12/2012 | Berkowitz et al. |
| 8,442,491 B2 | 5/2013 | Bae |
| 8,472,946 B2 | 6/2013 | Chan et al. |
| 8,498,612 B2 | 7/2013 | Chou |
| 8,515,418 B2 | 8/2013 | Weintraub et al. |
| 8,565,760 B2 | 10/2013 | Vanswol et al. |
| 8,588,771 B2 | 11/2013 | Costa et al. |
| 8,687,557 B2 | 4/2014 | Perkuhn et al. |
| 8,712,409 B2 | 4/2014 | Mannepally |
| 8,750,825 B2 | 6/2014 | Patterson et al. |
| 8,818,360 B2 * | 8/2014 | Agarwal ................ H04W 8/02 455/433 |
| 8,934,894 B2 | 1/2015 | Du et al. |
| 9,008,653 B2 | 4/2015 | Sparks et al. |
| 9,100,796 B2 | 8/2015 | Marsico |
| 9,185,141 B2 | 11/2015 | Perkuhn et al. |
| 9,215,335 B1 | 12/2015 | Nas et al. |
| 9,357,372 B1 | 5/2016 | Ridel et al. |
| 9,414,305 B2 | 8/2016 | Pankajakshan et al. |
| 9,503,879 B2 | 11/2016 | Faller et al. |
| 9,603,003 B2 | 3/2017 | Bellamkonda et al. |
| 9,668,203 B2 | 5/2017 | Zhang et al. |
| 9,692,892 B2 | 6/2017 | Jiang |
| 9,699,644 B2 | 7/2017 | Noldus et al. |
| 9,832,678 B1 | 11/2017 | Tandon et al. |
| 9,854,004 B2 | 12/2017 | Bharadwaj |
| 9,867,098 B2 | 1/2018 | Kwok et al. |
| 9,871,828 B2 | 1/2018 | Mufti et al. |
| 9,924,344 B1 | 3/2018 | Datar |
| 10,064,044 B2 | 8/2018 | Zhu |
| 10,257,690 B2 | 4/2019 | Neal |
| 10,292,040 B2 | 5/2019 | Dubesset et al. |
| 10,306,456 B2 | 5/2019 | Säkkinen et al. |
| 10,368,235 B1 | 7/2019 | Balasubramanian et al. |
| 10,531,273 B2 | 1/2020 | Lauster |
| 10,567,949 B2 | 2/2020 | Shah et al. |
| 10,743,177 B2 | 8/2020 | Dimperio et al. |
| 10,979,890 B2 | 4/2021 | Xu et al. |
| 10,984,128 B1 | 4/2021 | Hoffer |
| 11,032,692 B2 | 6/2021 | Anand et al. |
| 11,070,596 B1 | 7/2021 | Yau et al. |
| 11,082,828 B1 * | 8/2021 | Avetoom ................ H04W 8/02 |
| 11,659,376 B2 | 5/2023 | Avetoom |
| 2005/0101327 A1 * | 5/2005 | Nam .................... H04W 8/12 455/436 |
| 2005/0176424 A1 | 8/2005 | Kumar et al. |
| 2005/0227687 A1 | 10/2005 | Drevon |
| 2006/0046716 A1 | 3/2006 | Hofstaedter et al. |
| 2006/0068778 A1 * | 3/2006 | Della-Torre ............ H04W 8/02 455/432.1 |
| 2007/0021118 A1 | 1/2007 | Ophir |
| 2007/0167158 A1 | 7/2007 | Ajjannavar et al. |
| 2007/0281687 A1 | 12/2007 | Jiang |
| 2007/0293216 A1 | 12/2007 | Jiang |
| 2008/0194254 A1 | 8/2008 | Balon et al. |
| 2009/0082019 A1 | 3/2009 | Marsico |
| 2010/0093344 A1 | 4/2010 | Chan et al. |
| 2010/0184428 A1 | 7/2010 | Luo |
| 2010/0190470 A1 * | 7/2010 | Raleigh .................. H04W 4/20 455/406 |
| 2010/0273478 A1 | 10/2010 | Shon |
| 2012/0275442 A1 | 11/2012 | Malets et al. |
| 2013/0171974 A1 | 7/2013 | Bae |
| 2014/0349641 A1 * | 11/2014 | Jiang ................... H04W 4/029 455/432.3 |
| 2015/0106454 A1 | 4/2015 | Lim et al. |
| 2015/0304506 A1 * | 10/2015 | Zhu ...................... H04W 8/205 455/406 |
| 2017/0180997 A1 | 6/2017 | Mildh et al. |
| 2017/0272930 A1 * | 9/2017 | Jiang ................... H04M 15/8055 |
| 2017/0311151 A1 | 10/2017 | Ohashi et al. |
| 2019/0246263 A1 * | 8/2019 | Keren .................... H04W 4/24 |
| 2020/0167760 A1 | 5/2020 | Makhotin et al. |
| 2021/0076320 A1 | 3/2021 | Park et al. |
| 2021/0297844 A1 | 9/2021 | Prabhakar et al. |
| 2021/0297937 A1 * | 9/2021 | Baek .................... H04W 48/12 |
| 2021/0314760 A1 | 10/2021 | Avetoom |
| 2021/0392557 A1 * | 12/2021 | Mallikarjunan .... H04W 60/005 |
| 2022/0225074 A1 * | 7/2022 | Sama .................... H04W 8/12 |
| 2025/0071669 A1 | 2/2025 | Ishii |

FOREIGN PATENT DOCUMENTS

| | | | |
|---|---|---|---|
| CN | 109462619 B | 7/2021 | |
| EP | 1189473 A2 | 3/2002 | |
| EP | 1060636 B1 | 10/2006 | |
| EP | 0985309 B1 | 10/2007 | |
| EP | 2074858 B1 | 1/2013 | |
| EP | 1864464 B1 | 7/2017 | |
| JP | 2013197729 A | 9/2013 | |
| RU | 2587414 C2 * | 6/2016 | ............. H04W 4/60 |
| WO | 2006105223 A1 | 10/2006 | |
| WO | 2006127417 A1 | 11/2006 | |
| WO | 2007139883 A2 | 12/2007 | |
| WO | 2008064530 A1 | 6/2008 | |
| WO | 2010005278 A1 | 1/2010 | |
| WO | 2013095287 A1 | 6/2013 | |
| WO | 2014195809 A1 | 12/2014 | |
| WO | 2017054190 A1 | 4/2017 | |
| WO | 2021206598 A1 | 10/2021 | |

* cited by examiner

AUTOMATED AUDITS RELATING TO NETWORK CONFIGURATION UPDATES IN RESPONSE TO ROAMING PARTNER UPDATES

CROSS-REFERENCE TO RELATED APPLICATIONS

This application claims the benefit of U.S. Provisional Patent Application No. 63/429,357, filed on Dec. 1, 2022, entitled AUTOMATED INGESTION AND EXECUTION OF ROAMING PARTNER NETWORK UPDATES FOR MOBILE CARRIER, which is hereby incorporated by reference in its entirety.

BACKGROUND

A mobile network operator (MNO), also known as a wireless service provider, wireless carrier, cellular company, or mobile network carrier, is a provider of wireless communications services that owns or controls the elements necessary to sell and deliver services to an end-user, including radio spectrum allocation, wireless network infrastructure, back haul infrastructure, billing, customer care, provisioning computer systems, or marketing and repair organizations. Roaming refers to the ability for a cellular customer to automatically make and receive voice calls, send and receive data, or access other services, including home data services, when traveling outside the geographical coverage area of the home network, by means of using a visited network. For example, should a subscriber travel beyond their cell phone company's transmitter range, their cell phone would automatically hop onto another phone company's service, if available.

However, signal coverage issues can affect Wi-Fi roaming, e.g., when there are areas of a facility with degraded Wi-Fi signals between access points (APs). Client devices can get disconnected from a roaming network while trying to roam from one AP to another. Accumulated Airtime taken up by probe requests (which are transmitted at low data rates) sent by unconnected devices can often be greater than the accumulated Airtime taken up by network data. When a client device sends a probe request during the roaming process, it often waits for an AP to reply, causing the roaming process to be slow or fail. Moreover, adding new APs can increase the amount of signal overlap and delay the roaming process, thus affecting the performance of the applications being used. Furthermore, when APs on a network are not configured with the same basic settings, roaming can fail.

BRIEF DESCRIPTION OF THE DRAWINGS

Detailed descriptions of implementations of the present technology will be described and explained through the use of the accompanying drawings.

Figure 1:
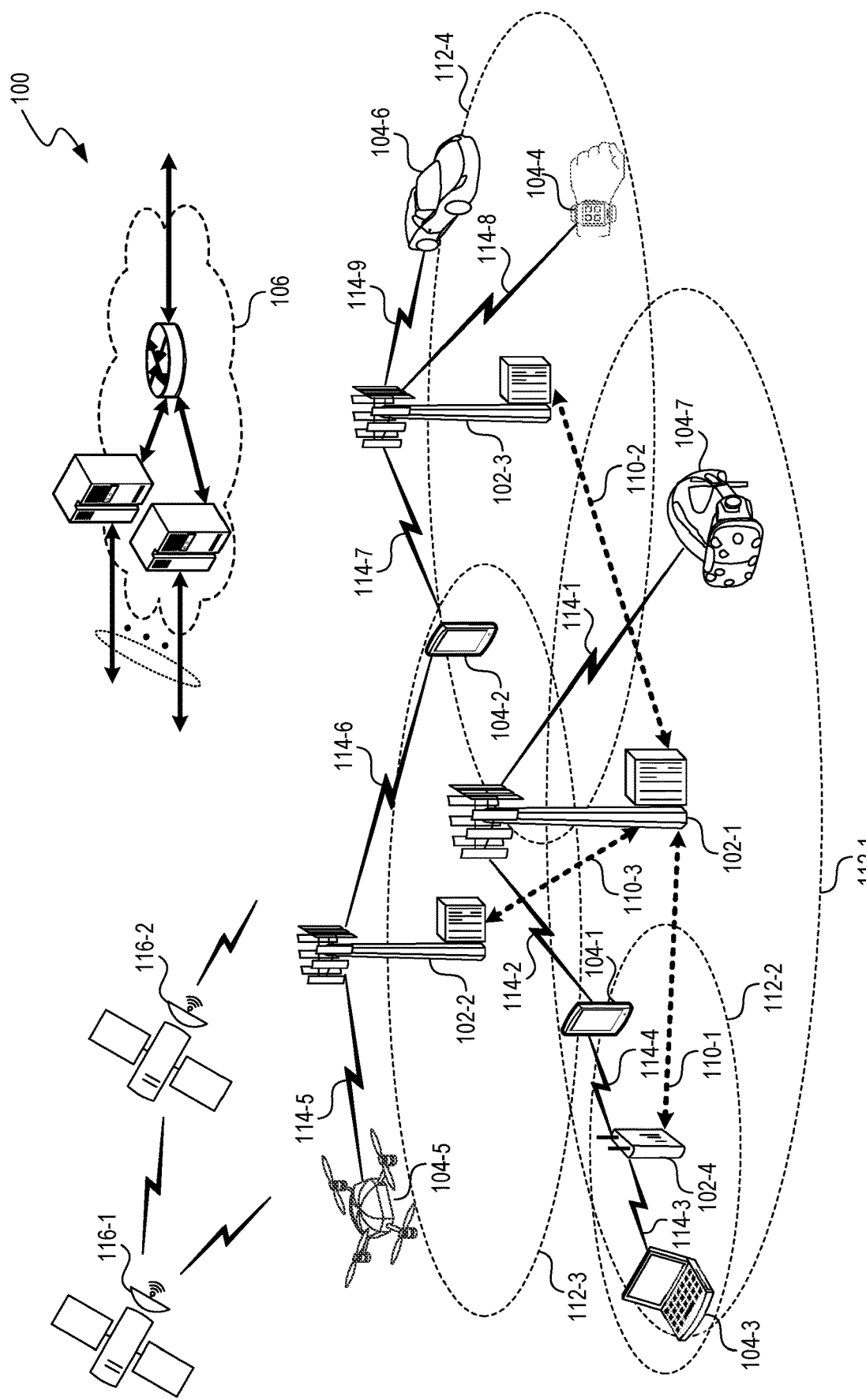
FIG. 1 is a block diagram that illustrates an example wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Roaming, in wireless telecommunication, refers to a mobile device being used outside the range of its native network and connecting to another available cellular network. Roaming includes the ability for a cellular customer to automatically make and receive voice calls, send and receive data, or access other services, including home data services, when traveling outside the geographical coverage area of the home network, by means of using a visited network. Roaming can be classified into "SIM-based roaming" and "username/password-based roaming," whereby the technical term "roaming" also encompasses roaming between networks of different network standards, e.g., Wireless Local Area Network (WLAN) or Global System for Mobile Communications (GSM).

This specification discloses methods, systems, and apparatuses for automated ingestion and execution of roaming partner network updates for mobile carriers. In some implementations, a first mobile network operator (MNO) periodically retrieves a roaming network update for reconfiguring one or more network subsystems of a network operated by the first MNO. A portion of the roaming network update is retrieved from an operator master database (OMD). The roaming network update includes roam data associated with a second MNO and configuration data for the one or more network subsystems. The roam data is retrieved via IR.21 information from a cloud server associated with the second MNO. The roam data specifies one or more telecommunications carriers associated with the second MNO. The one or more network subsystems for reconfiguration are identified based on the roaming network update. The one or more network subsystems include a home subscriber server (HSS) subsystem or a home location register (HLR) subsystem. The one or more network subsystems are reconfigured using the roaming network update to enable one or more user devices associated with the second MNO to communicate with infrastructure operated by the first MNO for roaming on the network.

In some implementations, at least one roaming network update associated with at least one MNO is periodically retrieved. The at least one roaming network update is retrieved from an OMD using an application programming interface (API). IR.21 information is periodically ingested from at least one cloud server associated with the at least one MNO. Configuration data is retrieved for at least one network subsystem of a network. An event-driven audit is performed of the at least one network subsystem based on the IR.21 information. The at least one network subsystem is queried based on the at least one roaming network update to determine at least one discrepancy between a state of the network and the IR.21 information. A change to the state of the network is determined to rectify the discrepancy. A network configuration table of the at least one network subsystem is mapped to the change to the state of the network. At least one command is executed on the at least one network subsystem to rectify the discrepancy. The configuration data is applied to the at least one network subsystem. The state of the network is reconfigured, based on the configuration data, to enable at least one user device associated with the at least one MNO to roam on the network.

In some implementations, multiple roaming network updates received from multiple MNOs are ingested for reconfiguring multiple network subsystems of a network. The multiple network subsystems are audited to determine a state of the network. For a particular network subsystem of the multiple network subsystems, a set of roaming network updates is grouped across the multiple roaming network updates. For example, the roaming network updates are grouped by volume of changes per node. The set of roaming network updates correspond to the particular network subsystem. The particular network subsystem comprises multiple nodes located across different time zones. The set of roaming network updates is grouped for application to the multiple nodes across the different time zones during the maintenance window. A maintenance window is determined to update the state of the network based on the audit. A type of interface is determined for the particular network subsystem. Using an interactive shell client, the set of roaming network updates is applied to the particular network subsystem to update the state of the network during the maintenance window. The interactive shell client corresponds to the type of interface. At least one user device associated with the multiple MNOs is permitted to roam on the network using an updated state of the network after the maintenance window.

The benefits and advantages of the implementations described herein include automatic computation of changes to MNO networks while obviating user intervention. The methods disclosed can be used for roaming scenarios using multiple sources, e.g., IR.21 information or OMD data. The disclosed apparatuses implement smart business logic for each roaming network node, combining aspects of IR.21 data, service-configuration in OMD, and engineering configurations. Further, the systems disclosed generate smart change suggestions to implement network updates per region, datacenter, or network node as necessary, reducing the end-user impact and operational-user impact. The benefits and advantages of the methods include an automated daily golden audit, which provides data consistency across different network node instances to reduce impacts of operational-user error and enable auto-correction. Because, a network audit is performed before locking the network and executing the change to the network, colliding of network changes is prevented. In addition, the advantages of the convolutional neural network (CNN) used for ML in the disclosed implementations include the obviation of feature extraction and the use of shared weight in convolutional layers, which means that the same filter (weights bank) is used for each node in the layer; this both reduces memory footprint and improves performance.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
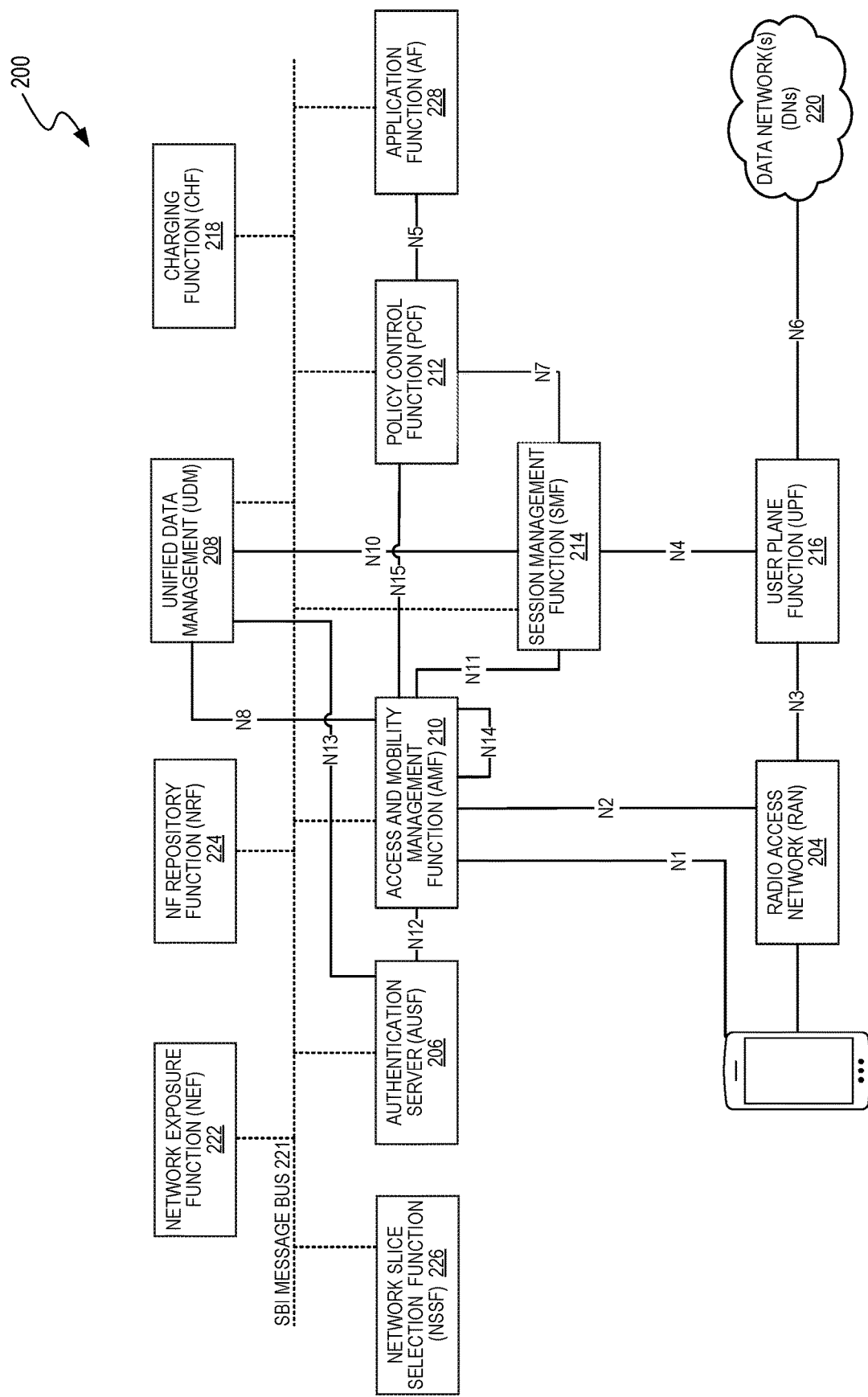
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that makeup a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Ingestion and Execution of Roaming Partner Network Updates

Figure 3:
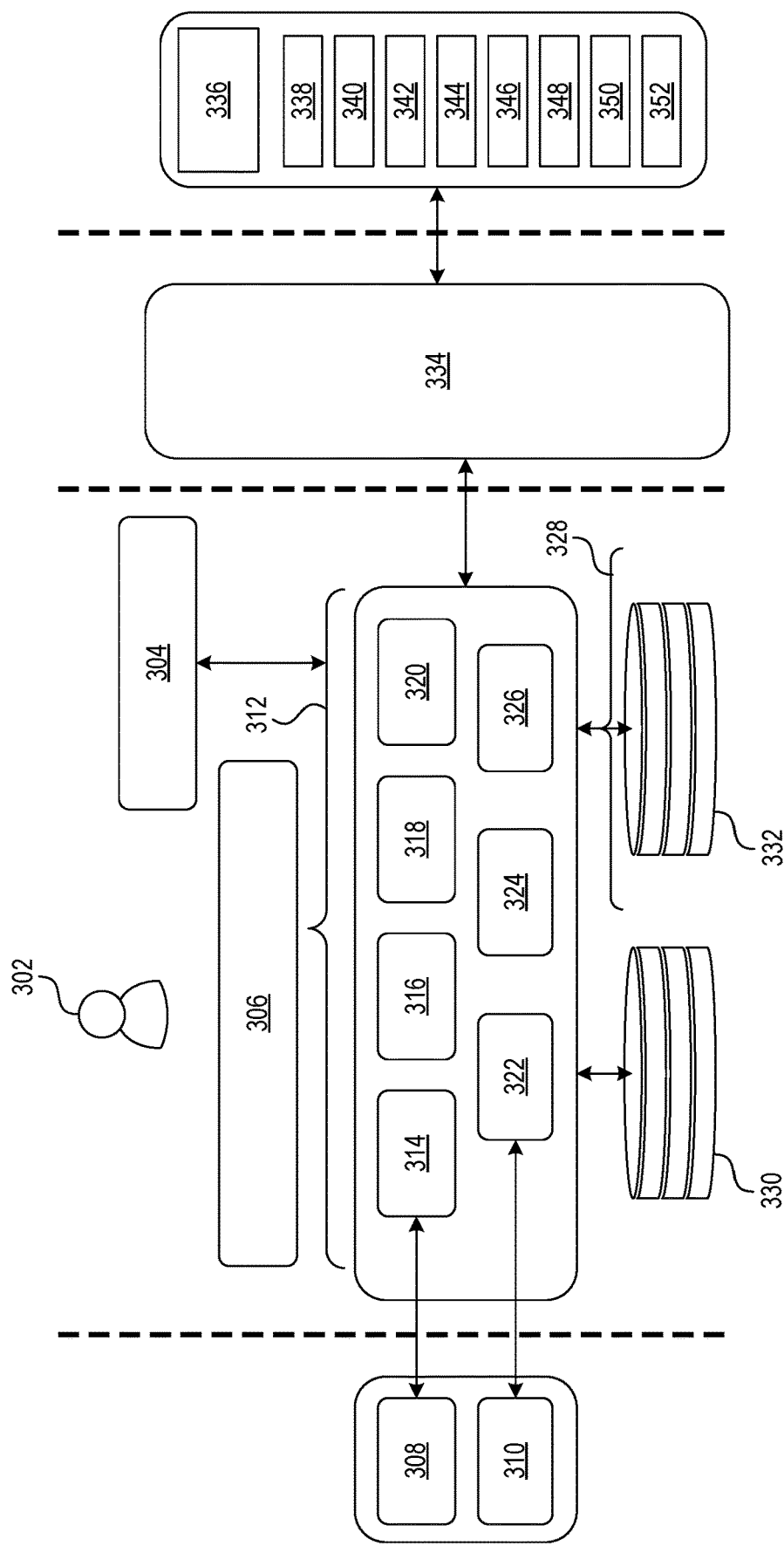
FIG. 3 is a drawing that illustrates example ingestion and execution of roaming partner network update.

FIG. 3 is a drawing that illustrates example ingestion and execution of roaming partner network updates. In implementations, roaming core system 306 executes an application programming interface (API) 312 that communicates with OMD ingestion module 314, user management module 316, security and access control module 318, configuration audit reporting module 320, IR.21 ingestion module 322, configuration audit management module 324, or network configuration management module 326. API 312 is a software program that enables two or more computer programs to communicate with each other. API 312 is a type of software interface, offering a service to other pieces of software. Each of the modules described herein can be implemented using a combination of software and computer hardware. Roaming core system 306 is implemented using the components of the example computer system 1000 illustrated and described in more detail with reference to FIG. 10. Likewise, implementations of roaming core system 306 can include different and/or additional components or can be connected in different ways.

The system shown by FIG. 3 receives input and provides information to diagnostic platform 304, which leverages existing tools and services to provide customer support to customers of a first MNO. The customer support is provided via the single platform (diagnostic platform 304) to troubleshoot technical issues, update account information, fix device-related issues, or file complaints or tickets.

In implementations, OMD ingestion module 314 periodically retrieves a portion of roaming network updates for reconfiguring one or more network subsystems (e.g., HSS subsystem/HLR subsystem 336, signal transfer point (STP) subsystem 338, or content-centric networking (CCN) subsystem 340) of a telecommunications network operated by the first MNO. An example telecommunications network 556 is illustrated and described in more detail with reference to FIG. 5.

In implementations, OMD ingestion module 314 retrieves a portion of the roaming network updates on an event-driven basis. An MNO, also known as a wireless service provider, wireless carrier, cellular company, or mobile network carrier, is a provider of wireless communications services that owns or controls all the elements necessary to sell and deliver services to an end-user, including radio spectrum allocation, wireless network infrastructure, back haul infrastructure, billing, customer care, provisioning computer systems, and marketing and repair organizations. A portion (OMD file 308) of the roaming network updates is retrieved from an OMD. An example OMD 514 is illustrated and described in more detail with reference to FIG. 5. The OMD provides a listing of launched roaming data/services. Roaming core system 306 uses the OMD to retrieve real-time partner updates. The portion of the roaming network updates retrieved from the OMD is sometimes referred to as "roam service change data." Example roam service change data 516 is illustrated and described in more detail with reference to FIG. 5.

In implementations, the roaming network update includes roam data retrieved by IR.21 ingestion module 322. Example roam data 510 is illustrated and described in more detail with reference to FIG. 5. The roam data is associated with one or more second MNOs different from the first MNO. An example second MNO 506 is illustrated and described in more detail with reference to FIG. 5. In implementations, the roam data is retrieved via IR.21 information from a cloud server 310 associated with the second MNO. The roam data can specify one or more telecommunications carriers associated with the second MNO. The one or more telecommunications carriers refer to companies that provide mobile services.

The IR.21 information can be retrieved as a document, a file, a form, any other data format, or a combination thereof. The IR.21 information is a source for network codes that enables user devices from a first network to roam on a second network based on operator-to-operator roaming agreements. For example, the IR.21 information lays out procedures and data formats to be used for updating the Global System for Mobile Communications Association (GSMA) Roaming Agreement Exchange (RAEX) IR.21 Roaming Database for storing the most important data for each MNO related to International Roaming. Operators have a common overview of the key data relevant to International Roaming. The cloud server 310 is sometimes referred to as a "Roamsys" server. An example Roamsys server 508 is illustrated and described in more detail with reference to FIG. 5. The one or more second MNOs are roaming partners of the first MNO. In some implementations, the roaming network update includes configuration data for the network subsystems. In other implementations, configuration data is received by roaming core system 306 from roaming system engineering (RSE) user 302. Example configuration data 524 is illustrated and described in more detail with reference to FIG. 5.

In implementations, configuration audit reporting module 320 and configuration audit management module 324 perform an event-driven audit of at least one network subsystem (e.g., HSS subsystem/HLR subsystem 336 or STP subsystem 338) based on the IR.21 information. An automated audit sequence is illustrated and described in more detail with reference to FIG. 4. HSS/HLR subsystem 336 is a central subscriber database that contains details of each subscriber that is authorized to use the mobile core network. HSS/HLR subsystem 336 is multi-tenant and supports multi country code. STP subsystem 338 is a node in an SS7 network that routes signaling messages based on their destination point code in the SS7 network. CCN subsystem 340 is a general-purpose network architecture in the design pattern of TCP/IP, running over or alongside it. CCN subsystem 340 supports a variety of networking applications including reducing backhaul congestion, IP/TV distribution, and enterprise storage.

Diameter routing agent (DRA) subsystem 342 is a functional element in a 3G or 4G (such as LTE) network that provides real-time routing capabilities for messages to be routed among the correct elements in a network. Policy and Charging Rules Function (PCRF) subsystem 344 is a software node designated in real-time to determine policy rules in a multimedia network. As a policy tool, the PCRF plays a central role in next-generation networks. Serving General Packet Radio Services (GPRS) Support Node (SGSN) subsystem 346 monitors a location of user devices and manages mobility between different locations without affecting its data sessions. An example user device 558 is illustrated and described in more detail with reference to FIG. 5. SGSN subsystem 346 also performs security functions and access control for user devices. Mobility management entity (MME) subsystem 348 presents a key control node for a cellular access network, manages user device access network and mobility, establishes the bearer path for user devices, and manages the bearer activation/deactivation process. Network traffic redirection (NTR) subsystem 350 is used for redirecting roaming network traffic in one or more telecommunication networks. Autonomous system number (ASN) subsystem 352 is used with Border Gateway Protocol (BGP) routing. BGP is the protocol underlying the global routing system of the Internet. BGP manages how packets get routed from network to network through the exchange of routing and reachability information among edge routers.

In implementations, network configuration management module 326 identifies one or more network subsystems (e.g., HSS/HLR subsystem 336) for reconfiguration based on the roaming network update. Network configuration management module 326 reconfigures the one or more network subsystems using the roaming network update to enable one or more user devices associated with the second MNO to communicate with infrastructure operated by the first MNO for roaming on the network. The one or more user devices are wireless devices 104-1, 104-2, 104-3, 104-4, 104-5, 104-6, and 104-7 that can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

In implementations, the one or more network subsystems are reconfigured using network method of procedure (MOP) execution engine 334 of the first MNO. Network MOP execution engine 334 prevents uncontrolled network changes, reduces risks, and improves efficiency in network change management. Network MOP execution engine 334 performs a step-by-step sequence for executing actions involving the change of state of critical components of the network. For example, network MOP execution engine 334 queries MME subsystem 348 using an API interface.

The network change (modification to the state of the network) can be automated as follows. Optionally, RSE user 302 reviews approves or rejects a work order suggestion. The work order suggestion refers to the sequence of changes to the network generated by network change determination module 536 illustrated and described in more detail with reference to FIG. 5. A network change orchestration platform (e.g., network MOP execution engine 334 illustrated and described in more detail with reference to FIG. 3) for network change request management is invoked. Network change APIs are invoked to generate a network change request based on a template of a network node. Optionally, RSE user 302 approves the network change request. The network change approval status is pulled from the network change system and ingested. The network changes requested from the network change orchestration platform are synchronized and ingested.

The network changes requested that are approved for the current maintenance window are executed. A maintenance window refers to a scheduled outage of services over a portion of the network for the sake of planned changes, upgrades, and/or repairs. Maintenance windows can be scheduled on an automated basis. For a high-availability service, such as an Internet hosting service or Internet service provider, the purpose of stating a time period in advance is to allow clients of the service to prepare for possible disruption or prepare for any major changes to the functioning of the service. This type of disclosure is typically guaranteed as part of a service-level agreement (SLA). For example, high-availability maintenance windows are often planned for a time where activity is at its lowest so as to cause minimal disruption to customers, though which also require unusual work schedules for the employees. An Internet service provider, for example, may schedule a maintenance window for Sunday during the night hours.

Maintenance window checks are performed, and asynchronous workflow execution of the network changes is initiated for the respective network nodes for which changes were determined. Multiple workflow items are generated per partner and per host. For example, roaming core system 306 generates parallel workflow items per partner and per host in the changes requested. A workflow refers to an orchestrated and repeatable pattern of activity, enabled by the systematic organization of resources into processes that transform materials, provide services, or process information. Workflow threads are generated sequentially per partner and per host in the changes requested. For example, roaming core system 306 generates sequential workflow items per partner and per host in the changes requested.

A work instance is generated for a pre-check phase and persisted into a database. Work events are published to be processed asynchronously. For example, an event processor loads a work event and executes the work event. The work event is consumed. Roaming core system 306 connects to a particular node using a particular interface based on the node type. For example, roaming core system 306 determines a type of interface for a particular network subsystem. Using an interactive shell client, roaming core system 306 applies a set of roaming network updates to the particular network subsystem to update the state of the network. The interactive shell client corresponds to the type of interface, e.g., SSH, API, or database call.

Roaming core system 306 performs a pre-check of the partner's network configuration. The execution status is persisted and the next sequential work item (network change execution) is initiated. The next sequential work item (network change execution) is published. The event processor loads the next sequential work item and executes the next sequential work item. The next sequential work item is consumed. The network change commands are executed using the particular interface based on the node type. If the downstream core node executes the work asynchronously, the event is published to the wait topic. The event is consumed from the wait topic, and a poll method of the respective work instance is invoked. The command to poll for task completion is invoked. If the task is not completed, the event is published back to the wait topic. The work instance is failed, and the status is updated. A notification is sent to RSE user 302 indicating the failure. The status of the respective work item is updated.

The execution status is persisted, and the next sequential work item is initiated for a post-check phase. The next work item is published (for post-check execution). The event processor consumes the event, and the post-check command is executed on the respective network configuration table. Network configuration tables store information about the hardware and software components of a network. Recording data into these tables, referring to these tables to look up information, and maintaining the accuracy of these tables are typically used instead of documentation that can include large amounts of text and configuration printouts. Network configuration tables hold essential information about the network devices. For example, a network configuration table includes device name and model, data link layer addresses and implemented features, network layer addresses and implemented features, or important information about the physical aspects of the device.

In some implementations, roaming core system 306 determines that reconfiguring the state of the network resulted in a failure. Responsive to determining that reconfiguring the state of the network resulted in a failure, a rollback operation is performed with respect to the state of the network. A rollback is an operation which returns the network to a previous state. Rollbacks are important for network integrity, because they mean that the network can be restored to a clean copy even after erroneous operations are performed. For example, if the post-check fails, the status of the post-check phase is updated and a rollback instance is generated. The rollback work event is published. The event processor loads the work event and executes the work event. The work event is consumed. The rollback command is executed on the respective network configuration table. A failure notification is sent to RSE user 302. The loop of network changes continues execution.

Figure 4:
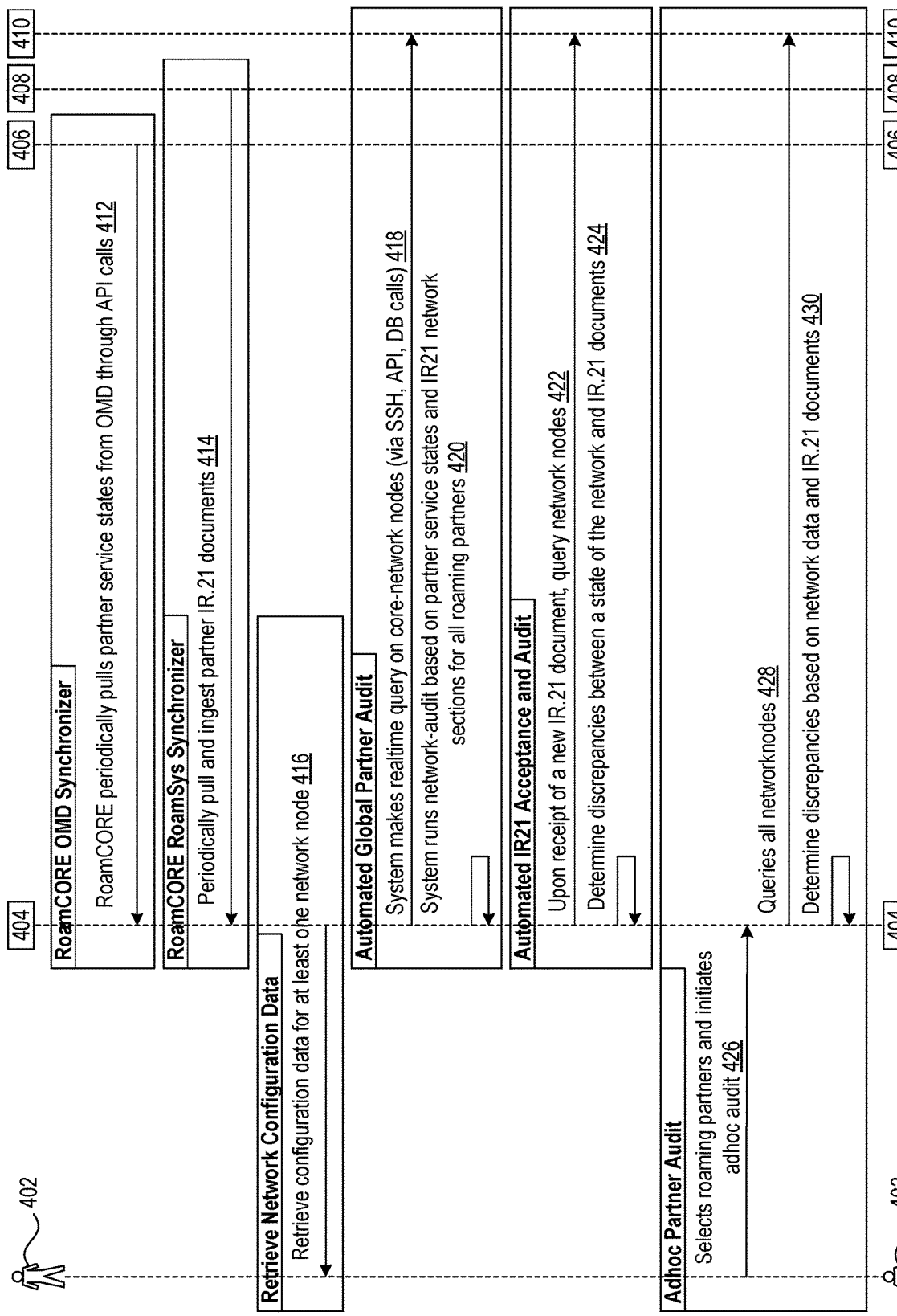
FIG. 4 is a flowchart that illustrates an example process for ingestion and execution of roaming partner network update.

FIG. 4 is a flowchart that illustrates an example process for ingestion and execution of roaming partner network update. In some implementations, the process is performed by roaming core system 404. Roaming core system 404 is similar to or same as roaming core system 306 illustrated and described in more detail with reference to FIG. 3. In some implementations, the process is performed by a computer system, e.g., the example computer system 1000 illustrated and described in more detail with reference to FIG. 10. Particular entities, for example, network MOP execution engine 334, performs some or all of the steps of the process in other implementations. Network MOP execution engine 334 is illustrated and described in more detail with reference to FIG. 3. Likewise, implementations can include different and/or additional steps or can perform the steps in different orders.

At 412, as part of a "RoamCORE OMD Synchronizer" process, roaming core system 404 periodically retrieves roaming network updates associated with MNOs. For example, multiple roaming network updates received from multiple MNOs are ingested for reconfiguring multiple network subsystems 410 (sometimes referred to as "network nodes") of a network. The MNOs are sometimes referred to as "partners" of a network operator associated with roaming core system 404. The roaming network updates are retrieved from OMD 406 using an API. In some implementations, the retrieved roaming network updates include roam data that specifies IP addresses associated with the MNOs.

At 414, as part of a "RoamCORE RoamSys Synchronizer" process, roaming core system 404 periodically ingests IR.21 information from at least one cloud server associated with the MNOs. In implementations, the IR.21 information specifies at least one of a technology used by the at least one MNO, a mobile network name, subscriber identity module (SIM) header information, SIM identity authentication data, international and domestic signaling connection control part (SCCP) information, or multimedia messaging service (MMS) inter-working and WLAN Information.

SIM information stores an international mobile subscriber identity number and its related key, which are used to identify and authenticate subscribers on mobile telephony devices. SCCP is a network layer protocol that provides extended routing, flow control, segmentation, connection-orientation, and error correction facilities in Signaling System 7 telecommunications networks. MMS is a method to send messages that include multimedia content to and from a mobile phone over a cellular network. An example telecommunications network 556 is illustrated and described in more detail with reference to FIG. 5. A WLAN is a wireless network that links two or more devices using wireless communication to form a local area network within a limited area.

At 416, as part of a "Retrieve Network Configuration Data" process, roaming core system 404 retrieves configuration data for network subsystems 410 (sometimes referred to as "network nodes") of a network. Example network subsystems 336-352 are illustrated and described in more detail with reference to FIG. 3. In implementations, a user 402 provides the configuration data. An example RSE user 302 is illustrated and described in more detail with reference to FIG. 3.

In some implementations, the network subsystems 410 include at least one of an STP subsystem, a DRA subsystem, a PCRF subsystem, an SGSN subsystem, an MME subsystem, an NTR subsystem, or an ASN subsystem. An example STP subsystem 338, an example DRA subsystem 342, an example PCRF subsystem 344, an example SGSN subsystem 346, an example MME subsystem 348, an example NTR subsystem 350, and an example ASN subsystem 352 are illustrated and described in more detail with reference to FIG. 3. For example, for a particular network subsystem of the multiple network subsystems 410, a set of roaming network updates is grouped from across the multiple roaming network updates. The grouped set of roaming network updates corresponds to the particular network subsystem. For example, the roaming network updates are grouped by volume of changes per node, as illustrated and described in more detail with reference to FIG. 11. The particular network subsystem includes multiple nodes located across different time zones, e.g., Eastern, Central, or Mountain. The set of roaming network updates is grouped for application to the multiple nodes across the different time zones.

At 418, to perform an Automated Global Partner Audit, roaming core system 404 queries the network subsystems 410 of a network (sometimes referred to as "core network nodes") based on the roaming network updates to determine at least one discrepancy between a state of the network and the IR.21 information. For example, the system queries the network subsystems 410 of a network using at least one of a secure shell (SSH) call, an API call, or a database call. The SSH protocol is a cryptographic network protocol for operating network services securely over an unsecured network. Example applications are remote login and command-line execution. A database call is a request to access data from a database to manipulate it or retrieve it and can be associated with a create, read, update, delete (CRUD) function.

At 420, roaming core system 404 runs a network audit based on partner service states and the IR.21 network sections for all roaming partners. In implementations, roaming core system 404 juxtaposes CCN subsystem 340 (illustrated and described in more detail with reference to FIG. 3) with the IR.21 information. A set of global titles of the network is broken down to compare CCN subsystem 340 with the IR.21 information to audit the one or more network subsystems. For example, global titles (GT) may be broken down as follows:

CC: 504
NDC: 95
StartRange: 000000
EndRange: 999999
GTs Broken Down-50495

At 422, to perform an Automated IR.21 Acceptance and Audit, roaming core system 404 queries the network subsystems 410 of the network upon receipt of updated IR.21 information, e.g., based on the at least one roaming network update. At 424, roaming core system 404 determines at least one discrepancy between a state of the network (network subsystems 410) and the IR.21 information. Eventually, roaming core system 404 determines a change to the state of the network to rectify the discrepancy. Roaming core system 404 maps a network configuration table of the network subsystems 410 to the change to the state of the network. Roaming core system 404 executes at least one command on the network subsystems 410 to rectify the discrepancy.

At 426, to perform an ad hoc partner audit, roaming core system 404 selects at least one roaming partner and initiates an ad hoc audit. At 428, roaming core system 404 queries all the network nodes (network subsystems 410). For example, roaming core system 404 queries the network subsystems 410 based on the roaming network updates to determine at least one discrepancy between a state of the network and the IR.21 information. In some implementations, roaming core system 404 queries the network subsystems 410 using at least one of an SSH call, an API call, or a database call.

At 430, roaming core system 404 determines discrepancies between the network data (network nodes) and the IR.21 information. For example, roaming core system 404 identifies the network subsystems 410 (network nodes) for reconfiguration based on the roaming network updates, the discrepancies, and the state of the network.

Figure 5:
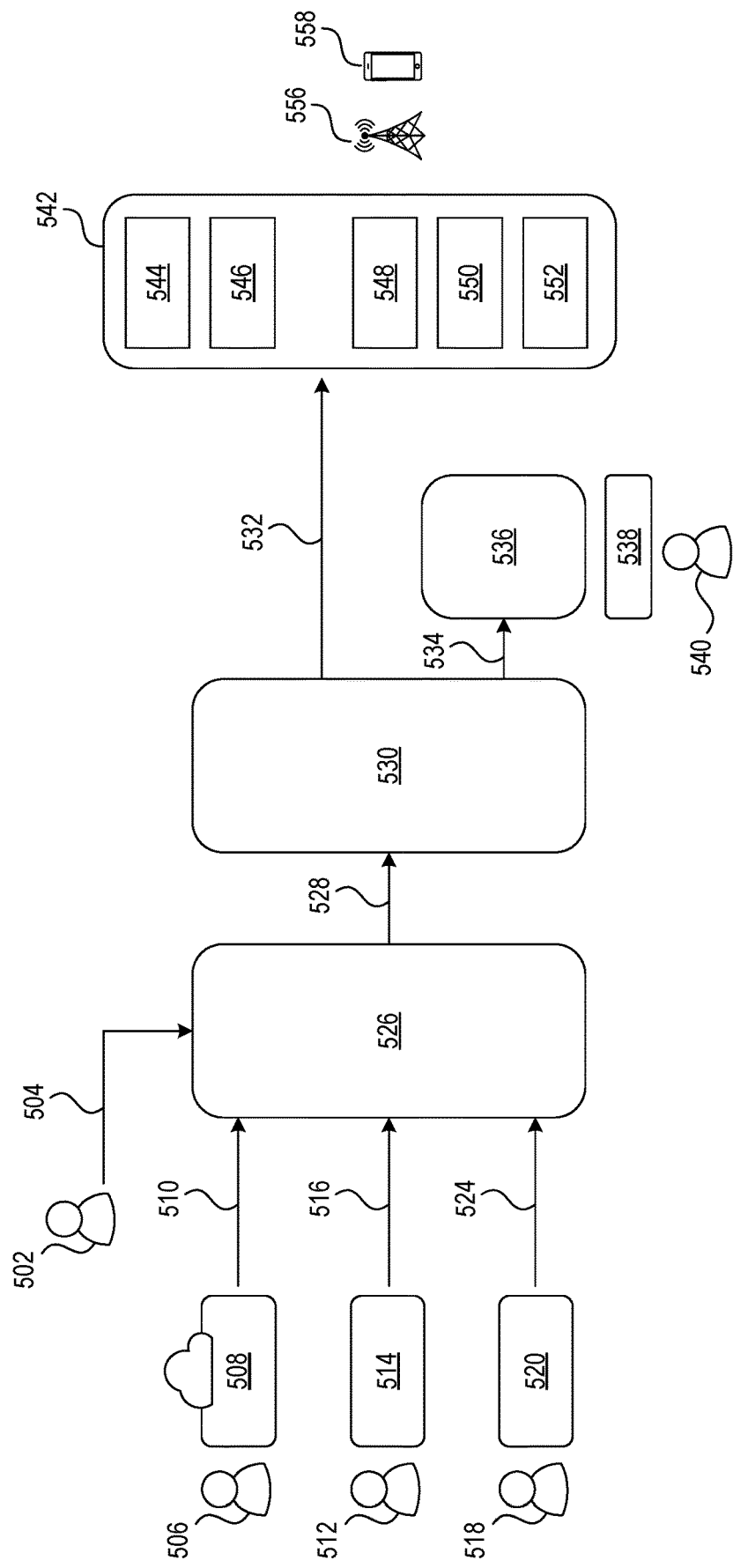
FIG. 5 is a drawing that illustrates example ingestion and execution of roaming partner network update.

FIG. 5 is a drawing that illustrates example ingestion and execution of roaming partner network update. The system shown by FIG. 5 includes Roamsys server 508, OMD 514, roamcore configuration subsystem 520, ingestion engine 526, audit engine 530, network change determination module 536, and network subsystems 542 (sometimes referred to as "network nodes"). Roamsys server 508 is the same as or similar to cloud server 310 illustrated and described in more detail with reference to FIG. 3. OMD 514 contains an OMD file that is the same as or similar to OMD file 308 illustrated and described in more detail with reference to FIG. 3. Ingestion engine 526 is the same as or similar to OMD ingestion module 314 and IR.21 ingestion module 322 illustrated and described in more detail with reference to FIG. 3. Audit engine 530 is the same as or similar to configuration audit reporting module 320 and configuration audit management module 324 illustrated and described in more detail with reference to FIG. 3. Network subsystems 542 are the same as or similar to the network subsystems (e.g., HSS/HLR subsystem 336) illustrated and described in more detail with reference to FIG. 3. Each of the engines/modules described herein can be implemented using a combination of software and computer hardware. The system shown by FIG. 5 is implemented using the components of the example computer system 1000 illustrated and described in more detail with reference to FIG. 10. Likewise, implementations of the system shown by FIG. 5 can include different and/or additional components or can be connected in different ways.

An automated audit sequence is illustrated and described in more detail with reference to FIG. 4. To perform an automated audit, ingestion engine 526 receives non-RAEX IR.21 information 504 from RSE user 502. Ingestion engine 526 receives roaming network updates including roam data 510 associated with at least one second MNO 506 (sometimes referred to as "roaming partners") and configuration data 524 for the one or more network subsystems 542. In implementations, roam data 510 is retrieved via IR.21 information from Roamsys server 508 associated with the second MNOs 506. Roam data 510 specifies one or more telecommunications carriers associated with the second MNOs 506. For example, the IR.21 information is associated with a GSMA RAEX IR.21 roaming database. GSMA is an industry organization that represents the interests of MNOs. More than 750 MNOs are full GSMA members and a further 400 companies in the broader mobile ecosystem are associate members. RAEX provides MNOs with the ability to electronically exchange operational roaming data (RAEX OpData) and commercial roaming rate information (RAEX IOT) using a centralized tools.

In implementations, ingestion engine 526 retrieves a portion 516 of the roaming network updates from OMD 514. The portion 516 is sometimes referred to as "roam service change data." OMD 514 is managed by roaming business (RB) team 512. For example, portion 516 is retrieved using an API. An example API 312 is illustrated and described in more detail with reference to FIG. 3. In implementations, ingestion engine 526 retrieves configuration data 524 from configuration database 520. Configuration database 520 is managed by RSE user 518. RSE user 518 and RSE user 502 are the same as or similar to RSE user 302 illustrated and described in more detail with reference to FIG. 3. After the automated network audit is performed on network 556 by audit engine 530, and network change determination module 536 has determined modifications to network 556, configuration data 524 is applied to the at least one network subsystem 542. The state of the network 556 is reconfigured, based on configuration data 524, to enable at least one user device 558 associated with the second MNOs to roam on network 556.

In implementations, audit engine 530 performs an event-driven audit of the network subsystems 542 based on the IR.21 information (passed in data 528 from ingestion engine 526). For example, network subsystems 542 include a first network subsystem (HSS subsystem 544) and a second network subsystem (HLR subsystem 546). Audit engine 530 audits the first network subsystem and the second network subsystem to determine whether first data stored by the first network subsystem is consistent with second data stored by the second network subsystem. In some implementations, the audit is periodic rather than event-driven. Network subsystems 542 (sometimes known as "network nodes") can also include STP subsystem 548, DRA subsystem 550, or PCRF subsystem 552. HSS subsystem 544/HLR subsystem 546 are similar to or the same as HSS subsystem/HLR subsystem 336 illustrated and described in more detail with reference to FIG. 3. STP subsystem 548 is similar to or the same as STP subsystem 338 illustrated and described in more detail with reference to FIG. 3. DRA subsystem 550 is similar to or the same as DRA subsystem 342 illustrated and described in more detail with reference to FIG. 3. PCRF subsystem 552 is similar to or the same as PCRF subsystem 344 illustrated and described in more detail with reference to FIG. 3.

In some implementations, audit engine 530 audits the multiple network subsystems 542 to determine a state of network 556. For example, audit engine 530 juxtaposes CCN subsystem 340 (illustrated and described in more detail with reference to FIG. 3) with the IR.21 information. A set of global titles of network 556 is broken down to compare CCN subsystem 340 with the IR.21 information to audit the one or more network subsystems 542. The results of the audit are provided to network change determination module 536 and RSE user 540 in the form of data 534 that can be displayed on graphical user interface (GUI) 538. RSE user 540 is the same as or similar to RSE user 502.

In some implementations, audit engine 530 queries the at least one network subsystem 542 based on the roaming network updates to determine at least one discrepancy between a state of the network 556 and the IR.21 information. Network change determination module 536 determines a change to the state of the network 556 to rectify the discrepancy. Network change determination module 536 can display the suggested change to the state of the network 556 on graphical user interface (GUI) 538 to RSE user 540. A network configuration table of the at least one network subsystem 542 is mapped to the suggested change to the state of the network 556. At least one command is executed on the network subsystems 542 to rectify the discrepancy. In some implementations, the network subsystems 542 include an STP subsystem 548 or a PCRF subsystem 552. For example, executing the command causes the roaming core system 306 (illustrated and described in more detail with reference to FIG. 3) to connect to the STP subsystem 548 or the PCRF subsystem 552 using an SSH client. An SSH client is a program that allows establishing secure and authenticated SSH connections to SSH servers. SSH client software is available for enterprise environment operating systems.

Figure 6:
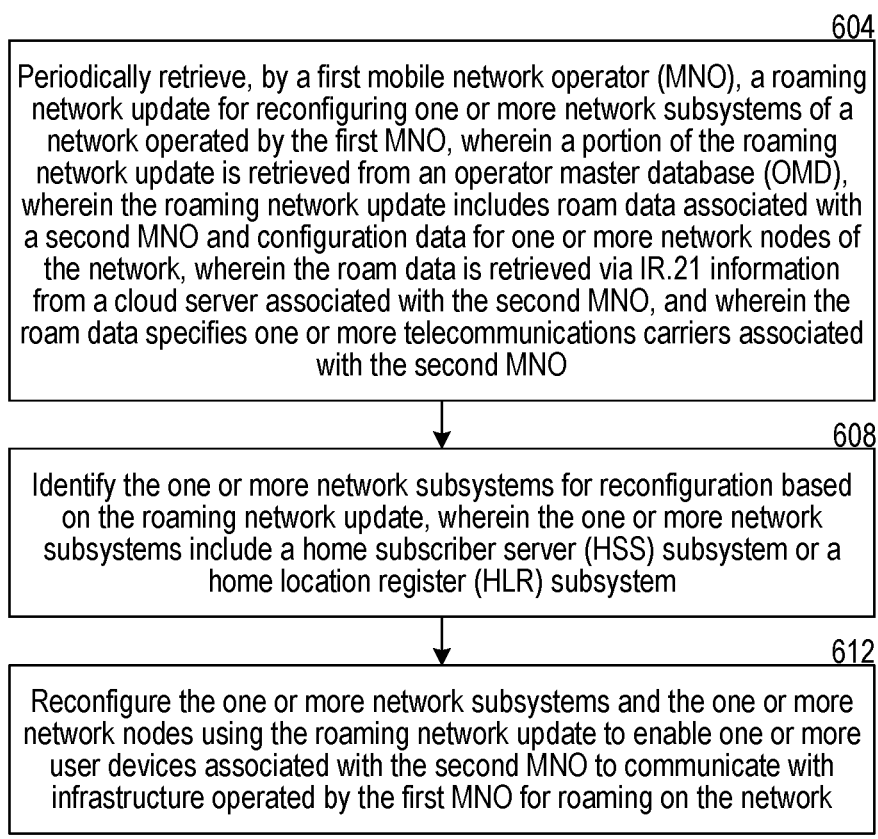
FIG. 6 is a flowchart that illustrates an example process for ingestion and execution of roaming partner network update.

FIG. 6 is a flowchart that illustrates an example process for ingestion and execution of roaming partner network update. In some implementations, the process is performed by roaming core system 306 illustrated and described in more detail with reference to FIG. 3. In some implementations, the process is performed by a computer system, e.g., the example computer system 1000 illustrated and described in more detail with reference to FIG. 10. Particular entities, for example, network MOP execution engine 334, performs some or all of the steps of the process in other implementations. Network MOP execution engine 334 is illustrated and described in more detail with reference to FIG. 3. Likewise, implementations can include different and/or additional steps or can perform the steps in different orders.

At 604, a first MNO periodically retrieves a roaming network update for reconfiguring one or more network subsystems of a network operated by the first MNO. An example telecommunications network 556 is illustrated and described in more detail with reference to FIG. 5. Example network subsystems 542 are illustrated and described in more detail with reference to FIG. 5. In some implementations, the network subsystems include at least one of an STP subsystem, a DRA subsystem, a PCRF subsystem, an SGSN subsystem, an MME subsystem, an NTR subsystem, or an ASN subsystem. An example STP subsystem 338, an example DRA subsystem 342, an example PCRF subsystem 344, an example SGSN subsystem 346, an example MME subsystem 348, an example NTR subsystem 350, and an example ASN subsystem 352 are illustrated and described in more detail with reference to FIG. 3.

A portion of the roaming network update is retrieved from an OMD. An example OMD 406 is illustrated and described in more detail with reference to FIG. 4. The roaming network update includes roam data associated with a second MNO and configuration data for the one or more network subsystems. An example second MNO 506 is illustrated and described in more detail with reference to FIG. 5. Example roam data 510 is illustrated and described in more detail with reference to FIG. 5. In some implementations, the roam data specifies one or more IP addresses associated with the second MNO.

In some implementations, the configuration data is retrieved from one or more RSE users. Example RSE user 518 and example configuration data 524 is illustrated and described in more detail with reference to FIG. 5. The roam data is retrieved via IR.21 information from a cloud server associated with the second MNO. An example cloud server (Roamsys server 508) is illustrated and described in more detail with reference to FIG. 5. The roam data specifies one or more telecommunications carriers associated with the second MNO. In some implementations, the IR.21 information is associated with a GSMA RAEX IR.21 roaming database.

At 608, the one or more network subsystems for reconfiguration are identified based on the roaming network update. In some implementations, the network subsystems include an HSS subsystem or an HLR subsystem. Example HSS/HLR subsystem 336 is illustrated and described in more detail with reference to FIG. 3.

At 612, the one or more network subsystems are reconfigured using the roaming network update to enable one or more user devices associated with the second MNO to communicate with infrastructure operated by the first MNO for roaming on the network. An example user device 558 is illustrated and described in more detail with reference to FIG. 5. In some implementations, the network subsystems are reconfigured using a network MOP execution engine of the first MNO. An example network MOP execution engine 334 is illustrated and described in more detail with reference to FIG. 3.

In some implementations, the first MNO determines that the network has experienced an error in operation. For example, one or more cellular towers may be malfunctioning or a disaster event may have occurred. Responsive to determining that the network has experienced an error, the first MNO sends a message to the second MNO. The message indicates that the second MNO should configure a second set of network subsystems associated with the second MNO. The reconfiguring is to enable a second set of user devices that are associated with the first MNO to roam on a second network operated by the second MNO. The roaming is to provide cellular/telecommunications service to the second set of user devices since the network (of the first MNO) is down. Settings and network updates for the second network can be provided to the second MNO by the first MNO using the implementations disclosed herein.

Figure 7:
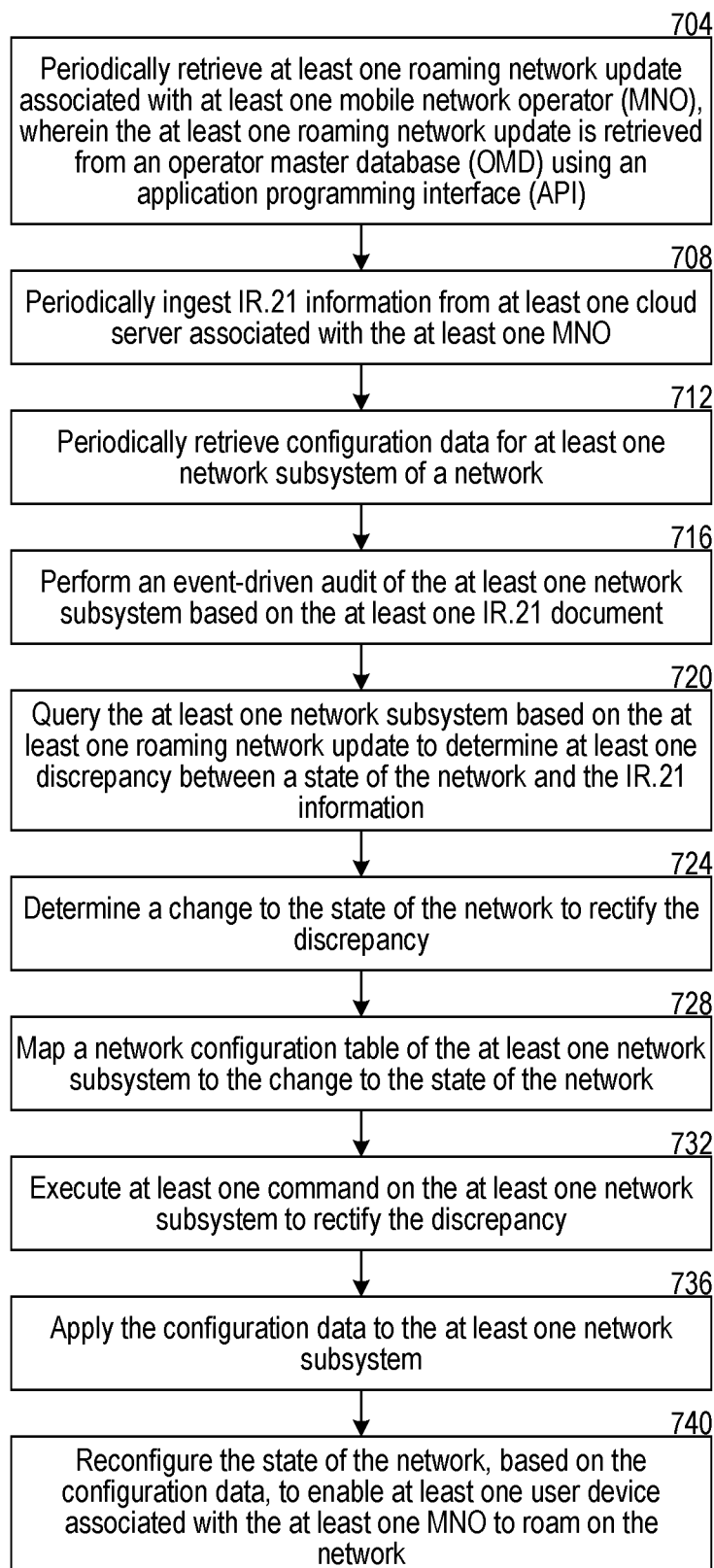
FIG. 7 is a flowchart that illustrates an example process for ingestion and execution of roaming partner network update.

FIG. 7 is a flowchart that illustrates an example process for ingestion and execution of roaming partner network update. In some implementations, the process is performed by roaming core system 306 illustrated and described in more detail with reference to FIG. 3. In some implementations, the process is performed by a computer system, e.g., the example computer system 1000 illustrated and described in more detail with reference to FIG. 10. Particular entities, for example, network MOP execution engine 334, performs some or all of the steps of the process in other implementations. Network MOP execution engine 334 is illustrated and described in more detail with reference to FIG. 3. Likewise, implementations can include different and/or additional steps or can perform the steps in different orders.

At 704, roaming core system 306 periodically retrieves roaming network updates associated with MNOs. An example MNO 506 is illustrated and described in more detail with reference to FIG. 5. The MNOs are sometimes referred to as partner or roaming partners. A portion of the roaming network updates is retrieved from an OMD using an API. An example OMD 406 is illustrated and described in more detail with reference to FIG. 4.

At 708, roaming core system 306 periodically ingests IR.21 information from at least one cloud server associated with the MNO. An example cloud server (Roamsys server 508) is illustrated and described in more detail with reference to FIG. 5. In some implementations, the IR.21 information specifies at least one of a technology used by the MNO (e.g., 2G, 3G, 4G, or 5G), a mobile network name, SIM header information, SIM identity authentication data, international and domestic SCCP information, or MMS inter-working and WLAN Information. At 712, roaming core system 306 periodically retrieves configuration data for at least one network subsystem of a network. An example telecommunications network 556, example configuration data 524, and example network subsystems 542 are illustrated and described in more detail with reference to FIG. 5.

At 716, roaming core system 306 performs an event-driven audit of the network subsystems based on the IR.21 information. An automated audit sequence is illustrated and described in more detail with reference to FIG. 4. For example, the network subsystems include a first network subsystem (HSS subsystem 544) and a second network subsystem (HLR subsystem 546). The first network subsystem and the second network subsystem are audited to determine whether first data stored by the first network subsystem is consistent with second data stored by the second network subsystem. In some implementations, the network includes a CCN subsystem. An example CCN subsystem 340 is illustrated and described in more detail with reference to FIG. 3. Roaming core system 306 juxtaposes the CCN subsystem with the IR.21 information. A set of global titles of the network are broken down to compare the CCN subsystem with the IR.21 information to perform the audit.

At 720, roaming core system 306 queries the network subsystems based on the roaming network updates to determine discrepancies between a state of the network and the IR.21 information. In some implementations, roaming core system 306 queries the network subsystems using at least one of an SSH call, an API call, or a database call. For example, a network MOP execution engine queries an MME subsystem using an API interface. An example network MOP execution engine 334 and example MME subsystem 348 are illustrated and described in more detail with reference to FIG. 3.

At 724, roaming core system 306 determines a change to the state of the network to rectify the discrepancy. At 728, roaming core system 306 maps a network configuration table of the at least one network subsystem to the change to the state of the network. At 732, roaming core system 306 executes at least one command on the network subsystems to rectify the discrepancy. In some implementations, the network subsystems include an STP subsystem or a PCRF subsystem. For example, executing the command causes the roaming core system 306 to connect to the STP subsystem or the PCRF subsystem using an SSH client. At 736, roaming core system 306 applies the configuration data to the at least one network subsystem.

At 740, roaming core system 306 reconfigures the state of the network, based on the configuration data, to enable at least one user device associated with the at least one MNO to roam on the network. An example user device 558 is illustrated and described in more detail with reference to FIG. 5. In some implementations, roaming core system 306 determines that reconfiguring the state of the network resulted in a failure. Responsive to determining that reconfiguring the state of the network resulted in a failure, roaming core system 306 performs a rollback operation with respect to the state of the network.

Figure 8:
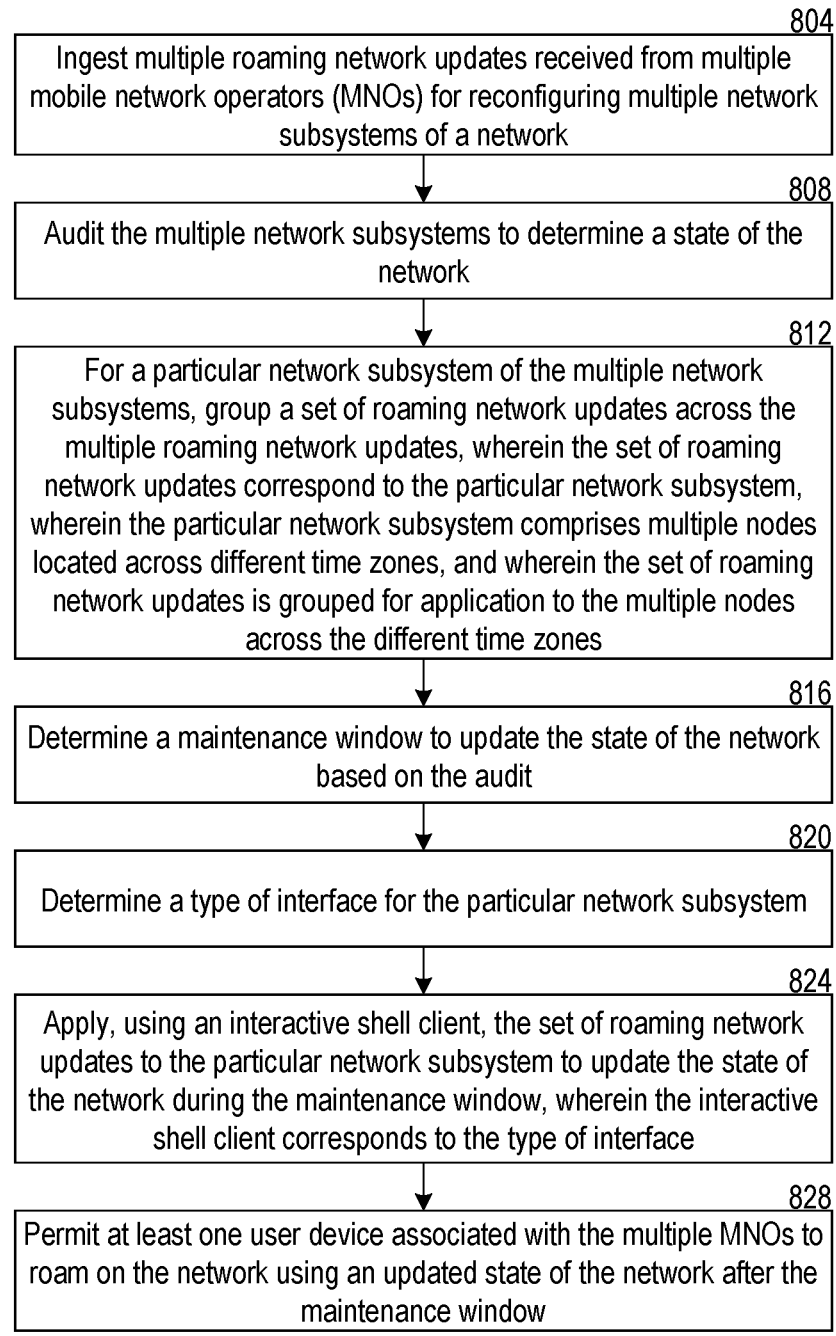
FIG. 8 is a flowchart that illustrates an example process for ingestion and execution of roaming partner network update.

FIG. 8 is a flowchart that illustrates an example process for ingestion and execution of a roaming partner network update. In some implementations, the process is performed by roaming core system 306 illustrated and described in more detail with reference to FIG. 3. In some implementations, the process is performed by a computer system, e.g., the example computer system 1000 illustrated and described in more detail with reference to FIG. 10. Particular entities, for example, network MOP execution engine 334, perform some or all of the steps of the process in other implementations. Network MOP execution engine 334 is illustrated and described in more detail with reference to FIG. 3. Likewise, implementations can include different and/or additional steps or can perform the steps in different orders.

At 804, roaming core system 306 ingests multiple roaming network updates received from multiple MNOs for reconfiguring multiple network subsystems of a network. An example telecommunications network 556, example MNO 506, and example network subsystems 542 are illustrated and described in more detail with reference to FIG. 5. At 808, roaming core system 306 audits the multiple network subsystems to determine a state of the network. An automated audit sequence is illustrated and described in more detail with reference to FIG. 4.

At 812, for a particular network subsystem of the multiple network subsystems, roaming core system 306 groups a set of roaming network updates across the multiple roaming network updates. The set of roaming network updates corresponds to the particular network subsystem. For example, the roaming network updates are grouped by volume of changes per node, as illustrated and described in more detail with reference to FIG. 11. The particular network subsystem includes multiple nodes located across different time zones. The set of roaming network updates is grouped for application to the multiple nodes across the different time zones during a maintenance window. Maintenance windows are described in more detail with reference to FIG. 3.

At 816, roaming core system 306 determines the maintenance window to update the state of the network based on the audit. Because, a network audit is performed before locking the network and executing the change to the network, colliding of network changes is prevented. The particular network subsystem is prevented from receiving cellular traffic during the maintenance window. At 820, roaming core system 306 determines a type of interface for the particular network subsystem. The type of interface can be API, SSH, etc.

At 824, roaming core system 306 applies, using an interactive shell client, the set of roaming network updates to the particular network subsystem to update the state of the network during the maintenance window. The interactive shell client corresponds to the type of interface. In some implementations, applying the set of roaming network updates causes the interactive shell client to perform database insertions at the particular network subsystem to modify the state of the network. For example, a database insert can be written in the Structured Query Language (SQL) data manipulation language (DML) for inserting one or more rows into a database table with specified table column values.

At 828, roaming core system 306 permits at least one user device associated with the multiple MNOs to roam on the network using an updated state of the network after the maintenance window. An example user device 558 is illustrated and described in more detail with reference to FIG. 5. In some implementations, roaming core system 306 is configured to determine that a change to the state of the network was applied by the interactive shell client to the particular network subsystem while the particular network subsystem was receiving cellular traffic (e.g., outside the maintenance window) Responsive to determining that the change was applied while the particular network subsystem was receiving cellular traffic, roaming core system 306 reverses the change to the state of the network (e.g., by a rollback operation).

In some implementations, roaming core system 306 captures roaming usage by the at least one user device on the network in a transferred account procedure (TAP). TAP is a procedure that includes call data records (CDRs) and IP detail records (IPDRs) that are sent to the public land mobile network (PLMN) of the roaming subscribers. A CDR is the detailed record of all the telephonic calls that pass through a telephone exchange or any other telecommunications equipment. An IPDR provides information about IP-based service usage and other activities that can be used as input when running operations support systems (OSS) and business support systems (BSS). The PLMN describes all mobile wireless networks that use earth-based stations rather than satellites. Roaming core system 306 sends the TAP to at least one MNO of the multiple MNOs. The at least one user device is associated with the at least one MNO.

In some implementations, roaming core system 306 receives SLA parameters from a user device roaming on the network. The state of the network is modified based on the SLA parameters. A telecom SLA defines a set of specific services tuned to the needs of a given customer, along with quality parameters that can be technical (for example, measured service availability) or organizational (such as reaction time or notification time). In some implementations, roaming core system 306 determines that the at least one user device is attempting to access the network. Roaming core system 306 determines that the at least one user device is unregistered on the network. Roaming core system 306 identifies at least one MNO of the multiple MNOs, wherein the at least one user device is associated with the at least one MNO. In this manner, the appropriate roaming partner is identified with whom the user device is associated. The user device can now be registered to roam on the network.

Figure 9:
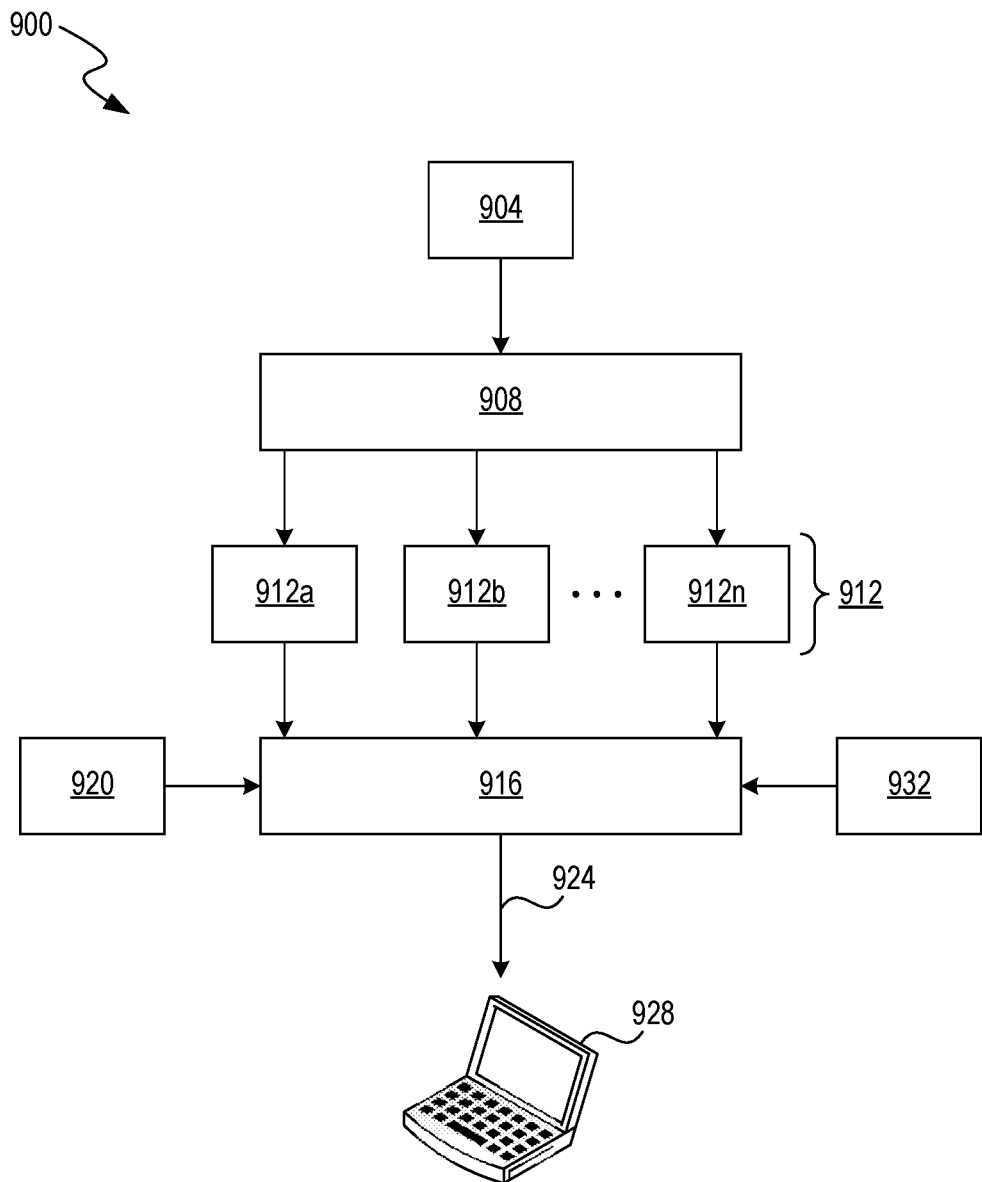
FIG. 9 is a block diagram that illustrates an example machine learning (ML) system that can implement aspects of the present technology.

FIG. 9 is a block diagram that illustrates an example ML system that can implement aspects of the present technology. The ML system 900 is implemented using components of the example computer system 1000 illustrated and described in more detail with reference to FIG. 10. For example, the ML system 900 can be implemented on the processor 1002 using instructions 1008 programmed in the memory 1006 illustrated and described in more detail with reference to FIG. 7. Likewise, implementations of the ML system 900 can include different and/or additional components or be connected in different ways. The ML system 900 is sometimes referred to as an ML module.

The ML system 900 includes a feature extraction module 908 implemented using components of the example computer system 1000 illustrated and described in more detail with reference to FIG. 10. In some implementations, the feature extraction module 908 extracts a feature vector 912 from input data 904. For example, the input data 904 is the state of the network subsystems 542, as described in more detail with reference to FIG. 5, and can be used to determine that reconfiguring the state of the network resulted in a failure. The feature vector 912 includes features 912a, 912b, . . . , 912n. For example, the feature extraction module 908 extracts a feature vector from the state of the network subsystems 542 described in more detail with reference to FIG. 5.

The feature extraction module 908 reduces the redundancy in the input data 904, e.g., repetitive data values, to transform the input data 904 into the reduced set of features 912, e.g., features 912a, 912b, . . . , 912n. The feature vector 912 contains the relevant information from the input data 904, such that events or data value thresholds of interest can be identified by the ML model 916 by using this reduced representation. In some example implementations, the following dimensionality reduction techniques are used by the feature extraction module 908: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate implementations, the ML model 916 performs deep learning (also known as deep structured learning or hierarchical learning) directly on the input data 904 to learn data representations, as opposed to using task-specific algorithms. In deep learning, no explicit feature extraction is performed; the features 912 are implicitly extracted by the ML system 900. For example, the ML model 916 can use a cascade of multiple layers of nonlinear processing units for implicit feature extraction and transformation. Each successive layer uses the output from the previous layer as input. The ML model 916 can thus learn in supervised (e.g., classification) and/or unsupervised (e.g., pattern analysis) modes. The ML model 916 can learn multiple levels of representations that correspond to different levels of abstraction, wherein the different levels form a hierarchy of concepts. In this manner, the ML model 916 can be configured to differentiate features of interest from background features.

In alternative example implementations, the ML model 916, e.g., in the form of a CNN generates the output 924, without the need for feature extraction, directly from the input data 904. For example, the output 924 is a determination that reconfiguring the state of the network resulted in a failure.

The output 924 is provided to the computer device 928, or roaming core system 306 illustrated and described in more detail with reference to FIG. 3. The computer device 928 is a server, computer, tablet, smartphone, smart speaker, etc., implemented using components of the example computer system 1000 illustrated and described in more detail with reference to FIG. 10. In some implementations, the steps performed by the ML system 900 are stored in memory on the computer device 928 for execution. In other implementations, the output 924 is displayed on the display device 1018 illustrated and described in more detail with reference to FIG. 10.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 916 can be a CNN that includes both convolutional layers and max pooling layers. The architecture of the ML model 916 can be "fully convolutional," which means that variable sized sensor data vectors can be fed into it. For all convolutional layers, the ML model 916 can specify a kernel size, a stride of the convolution, and an amount of zero padding applied to the input of that layer. For the pooling layers, the model 916 can specify the kernel size and stride of the pooling.

In some implementations, the ML system 900 trains the ML model 916, based on the training data 920, to correlate the feature vector 912 to expected outputs in the training data 920. For example, the ML model 916 is trained to determine that reconfiguring the state of the network resulted in a failure. As part of the training of the ML model 916, the ML system 900 forms a training set of features and training labels by identifying a positive training set of features that have been determined to have a desired property in question, and, in some implementations, forms a negative training set of features that lack the property in question.

The ML system 900 applies ML techniques to train the ML model 916, that when applied to the feature vector 912, outputs indications of whether the feature vector 912 has an associated desired property or properties, such as a probability that the feature vector 912 has a particular Boolean property, or an estimated value of a scalar property. The ML system 900 can further apply dimensionality reduction (e.g., via linear discriminant analysis (LDA), PCA, or the like) to reduce the amount of data in the feature vector 912 to a smaller, more representative set of data.

The ML system 900 can use supervised ML to train the ML model 916, with feature vectors of the positive training set and the negative training set serving as the inputs. In some implementations, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example implementations, a validation set 932 is formed of additional features, other than those in the training data 920, which have already been determined to have or to lack the property in question. The ML system 900 applies the trained ML model 916 to the features of the validation set 932 to quantify the accuracy of the ML model 916. Common metrics applied in accuracy measurement include: Precision and Recall, where Precision refers to a number of results the ML model 916 correctly predicted out of the total it predicted, and Recall is a number of results the ML model 916 correctly predicted out of the total number of features that had the desired property in question. In some implementations, the ML system 900 iteratively re-trains the ML model 916 until the occurrence of a stopping condition, such as the accuracy measurement indication that the ML model 916 is sufficiently accurate, or a number of training rounds having taken place. The validation set 932 can include data corresponding to a state of the network subsystems 542, as described in more detail with reference to FIG. 5. This allows the detected values to be validated using the validation set 932. The validation set 932 can be generated based on analysis to be performed.

Computer System

Figure 10:
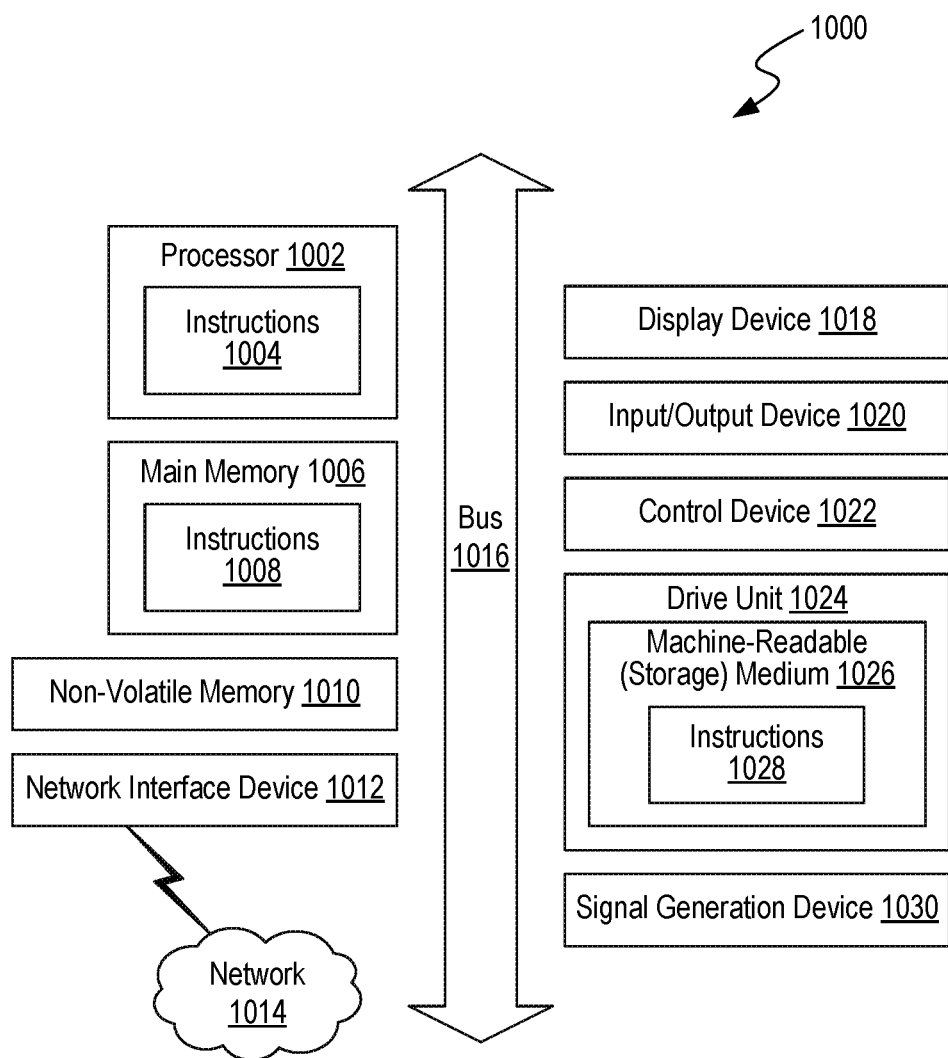
FIG. 10 is a block diagram that illustrates an example of a computer system in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, video display device 1018, an input/output device 1020, a control device 1022 (e.g., keyboard and pointing device), a drive unit 1024 that includes a storage medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification can be implemented.

The computer system 1000 can take any suitable physical form. For example, the computing system 1000 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1000. In some implementation, the computer system 1000 can be an embedded computer system, a system-on-chip (SOC), a single-board computer system (SBC) or a distributed system such as a mesh of computer systems or include one or more cloud components in one or more networks. Where appropriate, one or more computer systems 1000 can perform operations in real-time, near real-time, or in batch mode.

The network interface device 1012 enables the computing system 1000 to mediate data in a network 1014 with an entity that is external to the computing system 1000 through any communication protocol supported by the computing system 1000 and the external entity. Examples of the network interface device 1012 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable (storage) medium 1026 can include any medium that is capable of storing, encoding, or carrying a set of instructions for execution by the computing system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computing system 1000 to perform operations to execute elements involving the various aspects of the disclosure.

Figure 11:
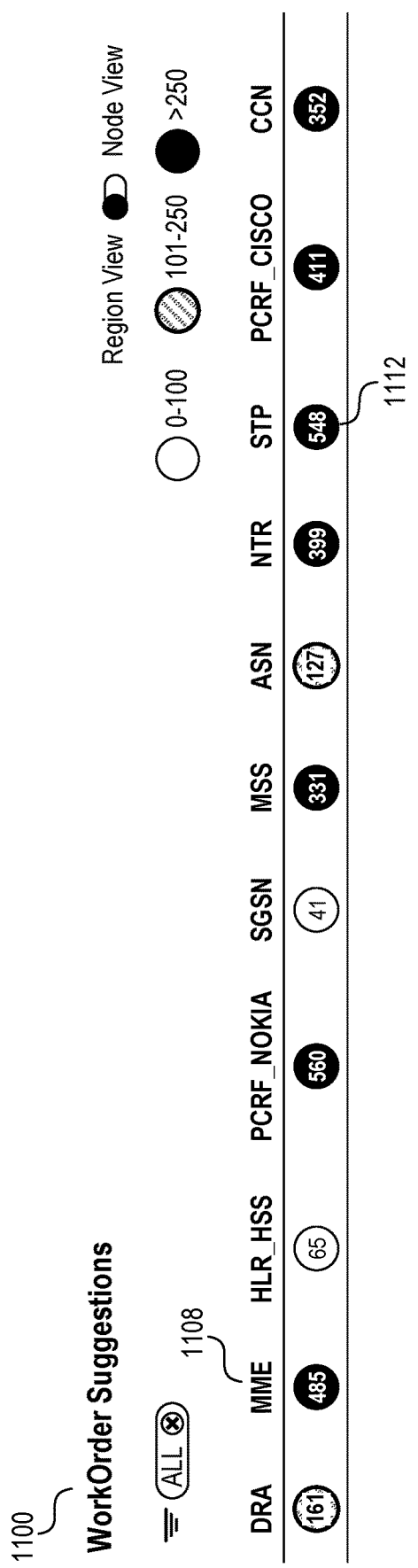
FIG. 11 is a drawing that illustrates grouping of roaming network updates by volume of changes per network node.

FIG. 11 is a drawing that illustrates grouping of roaming network updates 1100 by volume of changes per network node. FIG. 11 shows updates listed for a DRA subsystem, an MME subsystem, an HLR/HSS subsystem, etc. An example DRA subsystem 342, an example MME subsystem 348, and an example HSS/HLR subsystem 336 are illustrated and described in more detail with reference to FIG. 3. Likewise, implementations of the grouping can include different and/or additional components or can be ordered in different ways.

In some implementations, for a particular network subsystem 1108 (e.g., MME subsystem) of the multiple network subsystems, a set of roaming network updates (e.g., 485 updates) is grouped across the multiple roaming network updates 1100. The set of roaming network updates corresponds to the particular network subsystem 1108. The particular network subsystem 1108 can include multiple nodes located across different time zones. The set of roaming network updates is grouped for application to the multiple nodes across the different time zones. In an example, a set of multiple roaming network updates is grouped in accordance with a volume 1112 of the multiple roaming network updates 1100 per a network subsystem (e.g., the STP subsystem). An example STP subsystem 338 is illustrated and described in more detail with reference to FIG. 3.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. An example intended to be interpreted as a mean-plus-function example will use the words "means for." However, the use of the term "for" in any other context is not intended to invoke a similar interpretation. The applicant reserves the right to pursue such additional claim forms in either this application or in a continuing application.

We claim:

1. A system comprising:
   at least one hardware processor; and
   at least one non-transitory memory storing instructions, which, when executed by the at least one hardware processor, cause the system to:
      periodically retrieve, by a first mobile network operator (MNO), a roaming network update for reconfiguring one or more network subsystems of a network operated by the first MNO,
         wherein a portion of the roaming network update is retrieved from an operator master database (OMD),
         wherein the roaming network update includes roam data associated with a second MNO and configuration data for the one or more network subsystems, wherein the roam data is retrieved via IR.21 information from a cloud server associated with the second MNO, and
wherein the roam data specifies one or more telecommunications carriers associated with the second MNO;
identify the one or more network subsystems for reconfiguration based on the roaming network update, wherein the one or more network subsystems include a home subscriber server (HSS) subsystem or a home location register (HLR) subsystem; and
reconfigure the one or more network subsystems using the roaming network update to enable one or more user devices associated with the second MNO to communicate with infrastructure operated by the first MNO for roaming on the network.

2. The system of claim 1, wherein the instructions cause the system to reconfigure the one or more network subsystems using a network method of procedure (MOP) execution engine of the first MNO.

3. The system of claim 1, wherein the configuration data is retrieved from one or more RSE users.

4. The system of claim 1, wherein the one or more network subsystems include at least one of a signaling transfer point (STP) subsystem, a diameter routing agent (DRA) subsystem, a policy and charging rules function (PCRF) subsystem, a serving general packet radio service support node (SGSN) subsystem, a mobility management entity (MME) subsystem, a network traffic redirection (NTR) subsystem, or an autonomous system number (ASN) subsystem.

5. The system of claim 1, wherein the roam data specifies one or more Internet protocol (IP) addresses associated with the second MNO.

6. The system of claim 1, wherein the IR.21 information is associated with a global system for mobile communications association (GSMA) roaming agreement exchange (RAEX) IR.21 roaming database.

7. The system of claim 1, wherein the one or more network subsystems are a first one or more network subsystems,
wherein the network is a first network,
wherein the one or more user devices are a first one or more user devices, and
wherein the instructions cause the system to:
determine that the first network has experienced an error in operation; and
responsive to determining that the first network has experienced an error, send, to the second MNO, a message to configure a second one or more network subsystems associated with the second MNO to enable a second one or more user devices associated with the first MNO to roam on a second network operated by the second MNO.

8. At least one non-transitory computer-readable storage medium storing instructions, which, when executed by at least one data processor of a system, cause the system to:
retrieve a roaming network update for reconfiguring one or more network subsystems of a first network,
wherein a portion of the roaming network update is retrieved from an operator master database (OMD),
wherein the roaming network update includes roam data and configuration data for the one or more network subsystems and
wherein the roam data is retrieved via IR.21 information and specifies one or more telecommunications carriers;
identify the one or more network subsystems for reconfiguration based on the roaming network update;
reconfigure the one or more network subsystems using the roaming network update to enable a first one or more user devices to roam on the first network;
determine that the first network has experienced an error in operation; and
responsive to determining that the first network has experienced an error, send, to a second network, a message to configure the second network to enable a second one or more user devices associated with the first network to roam on the second network.

9. The non-transitory computer-readable storage medium of claim 8, wherein the instructions cause the system to:
juxtapose a content-centric networking (CCN) subsystem of the one or more network subsystems with the IR.21 information; and
break down a set of global titles of the network to compare the CCN subsystem with the IR.21 information to audit the one or more network subsystems.

10. The non-transitory computer-readable storage medium of claim 8, wherein the instructions cause the system to reconfigure the one or more network subsystems using a network method of procedure (MOP) execution engine.

11. The non-transitory computer-readable storage medium of claim 8, wherein the configuration data is retrieved from one or more remote subscriber equipment (RSE) users.

12. The non-transitory computer-readable storage medium of claim 8, wherein the one or more network subsystems include at least one of a signaling transfer point (STP) subsystem, a diameter routing agent (DRA) subsystem, a policy and charging rules function (PCRF) subsystem, a serving general packet radio service support node (SGSN) subsystem, a mobility management entity (MME) subsystem, a network traffic redirection (NTR) subsystem, or an autonomous system number (ASN) subsystem.

13. The non-transitory computer-readable storage medium of claim 8, wherein the roam data specifies one or more Internet protocol (IP) addresses.

14. The non-transitory computer-readable storage medium of claim 8, wherein the IR.21 information is associated with a global system for mobile communications association (GSMA) roaming agreement exchange (RAEX) IR.21 roaming database.

15. At least one non-transitory computer-readable storage medium storing instructions, which, when executed by at least one data processor of a system, cause the system to:
retrieve a roaming network update for reconfiguring one or more network subsystems of a network,
wherein a portion of the roaming network update is retrieved from an operator master database (OMD),
wherein the roaming network update includes roam data and configuration data for the one or more network subsystems and
wherein the roam data is retrieved via IR.21 information and specifies one or more telecommunications carriers;
identify the one or more network subsystems for reconfiguration based on the roaming network update; and
reconfigure the one or more network subsystems using the roaming network update to enable one or more user devices to roam on the network.

16. The non-transitory computer-readable storage medium of claim 15, wherein the network is a first network, wherein the one or more user devices are a first one or more user devices, and wherein the instructions cause the system to:
  determine that the first network has experienced an error in operation; and
  responsive to determining that the first network has experienced an error, send, to a second network, a message to configure the second network to enable a second one or more user devices associated with the first network to roam on the second network.

17. The non-transitory computer-readable storage medium of claim 15, wherein the instructions cause the system to reconfigure the one or more network subsystems using a network method of procedure (MOP) execution engine.

18. The non-transitory computer-readable storage medium of claim 15, wherein the configuration data is retrieved from one or more remote subscriber equipment (RSE) users.

19. The non-transitory computer-readable storage medium of claim 15, wherein the one or more network subsystems include at least one of a signaling transfer point (STP) subsystem, a diameter routing agent (DRA) subsystem, a policy and charging rules function (PCRF) subsystem, a serving general packet radio service support node (SGSN) subsystem, a mobility management entity (MME) subsystem, a network traffic redirection (NTR) subsystem, or an autonomous system number (ASN) subsystem.

20. The non-transitory computer-readable storage medium of claim 15, wherein the roam data specifies one or more Internet protocol (IP) addresses.

* * * * *